No. 743,401. Patented November 3, 1903.

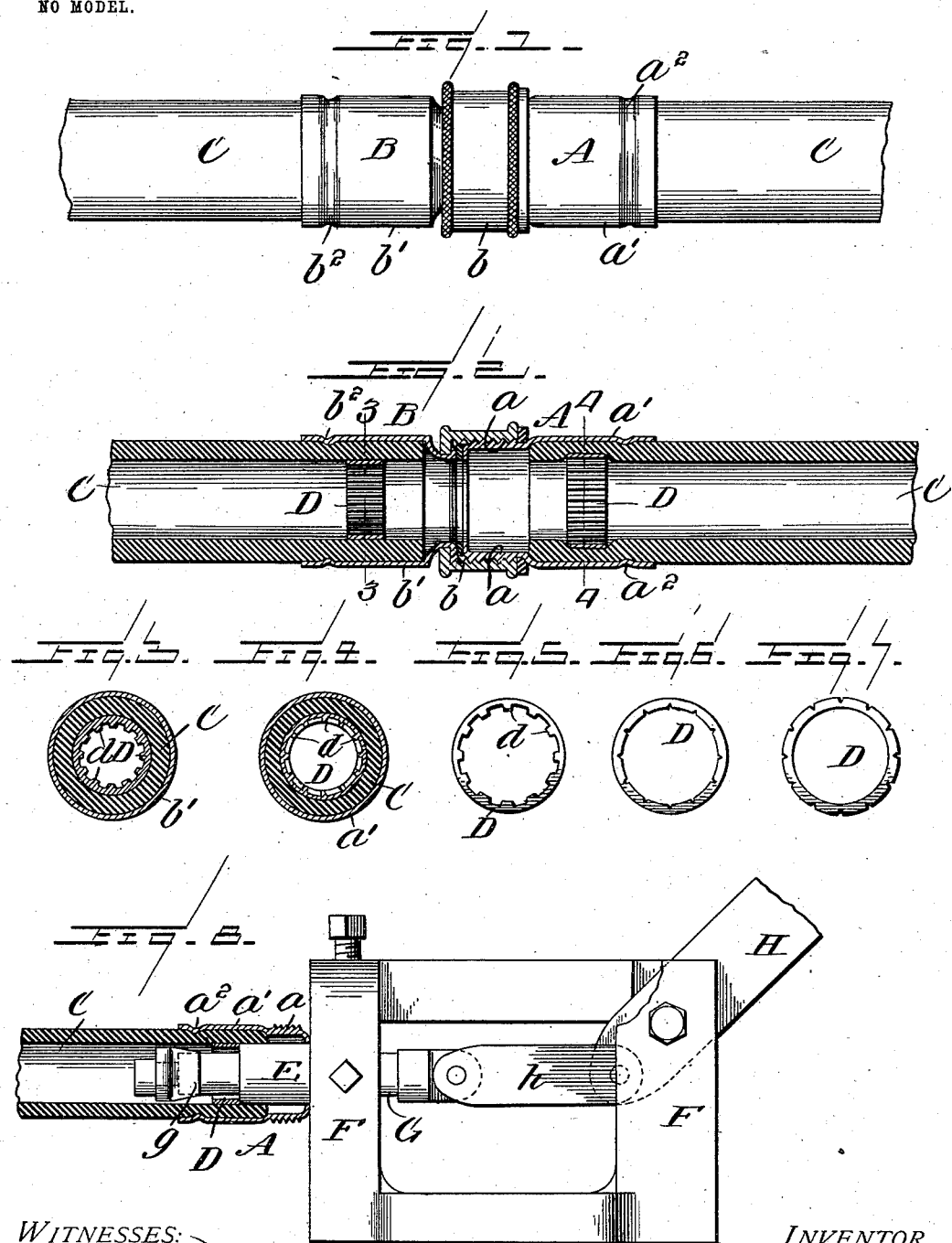

UNITED STATES PATENT OFFICE.

HOWARD B. SHERMAN, OF BATTLECREEK, MICHIGAN.

MEANS FOR ATTACHING HOSE TO COUPLINGS.

SPECIFICATION forming part of Letters Patent No. 743,401, dated November 3, 1903.

Application filed March 30, 1903. Serial No. 150,329. (No model.)

*To all whom it may concern:*

Be it known that I, HOWARD B. SHERMAN, of Battlecreek, in the county of Calhoun and State of Michigan, have invented certain new and useful Improvements in Means for Attaching Hose to Couplings; and I hereby declare that the following is a full, clear, and exact description thereof, reference being had to the accompanying drawings, which form part of this specification.

This invention is an improvement in means for attaching hose to couplings, and particularly resides in the peculiar construction of an expansible ferrule or ring which is adapted to be expanded within the end of a hose-section after the latter is inserted in the thimble or sleeve of the coupling member, so as to fasten the hose and coupling member securely and water-tightly together.

Heretofore hose-sections have been connected with coupling members by expanding ferrules of various kinds in the hose and sleeves, so that I do not claim such method or means of fastening broadly; but my invention is distinguished from these prior devices by the peculiar construction of the ferrule, as hereinafter claimed, by which it has the necessary thickness to enable it to be expanded sufficiently to firmly secure the hose to the coupling, and yet it can be expanded more easily than the solid ferrule of like thickness heretofore known, and, further, does not offer as much obstruction to the waterway as the previously-known ferrules.

The accompanying drawings illustrate the invention clearly, and I will now describe the same with reference thereto.

Figure 1 is a side view of a hose-coupling complete, indicating the positions of the ferrules by dotted lines. Fig. 2 is a longitudinal section through such coupling, showing one of my improved ferrules expanded in one coupling member and another in unexpanded condition in the other. Fig. 3 is a transverse section on line 3 3, Fig. 2; Fig. 4, a similar section on line 4 4, Fig. 2. Figs. 5, 6, and 7 are detail views of ferrules detached, and Fig. 8 is a detail sectional view of a machine for expanding the ferrules.

As shown in the drawings, the coupling is of the ordinary separable type, comprising a male and female member. The wall A has a threaded portion $a$ and a sleeve portion $a'$ of slightly greater diameter, and in the example shown this sleeve $a'$ is provided with an inwardly-projecting bead $a^2$ near its outer end. The female member B consists of a sleeve portion $b'$, swiveled onto an internally-threaded ring $b$, which is adapted to be engaged with the threaded part $a'$ of member A. The sleeve $b'$ has a bead or rib $b^2$ near its outer end, as shown.

There is nothing herein claimed on the particular construction of the coupling proper. It is shown as made of sheet or drawn metal; but it may be cast and of any desired shape and size, the present invention relating entirely to the means for fastening the hose ends in the sleeves, which is similar for both hose members, so that a description of the attachment of the hose end to member A will explain the attachment of hose end to part B also, similar letters of reference being used in explaining same.

The hose C, which may be of any suitable make, is of such diameter externally as to fit closely within the sleeve $a'$ and is inserted therein until it abuts against the shoulder at the junction of the sleeve with part $a$. One of my new expansible rings or ferrules D is then inserted in the sleeve and hose in position between the rib $a^2$ and part $a$, as indicated at the left-hand side of Fig. 2, and said ring is then expanded by suitable mechanism, so that it will expand and press the hose tightly within and against the sleeve $a'$, as shown at the right-hand side of Fig. 2. This holds the hose securely in position and forms a practically permanent connection between hose and coupling member so long as the hose remains sound and the parts unbroken.

The use of an expanded ring to secure hose in couplings is old, as above stated; but my ferrule D is of peculiar novel construction. The essential features of my ferrule are that it has a thin annular portion unbroken and a concentric annular broken portion, which increases the thickness of the ferrule. The broken portion may be formed by cutting or notching solid-metal rings in any suitable way, so as to reduce the expansible cross-section area thereof or by drawing or casting solid-metal rings with corrugations or notches or threads for the same purpose, the essential requirements of my ferrule being that it shall have such a small internal diameter that it can be readily operated upon by the expanding-tool, while the actual cross-sectional area of the expansible portion of the ferrule shall be less than the gross cross-sectional area thereof, thereby lessening the power required to expand it.

I prefer to make the ferrules with inwardly-projecting corrugations, ribs, or teeth by notching, channeling, or grooving the inner side thereof. It is obvious that the notches or grooves lessen the expansible area of the ferrule, and its thickness measured on a radial line through a rib, tooth, or projection is much greater than the width of the ring measured on a radial line in a groove, space, or notch between the teeth or ribs.

It is necessary that the ferrule be thick, so that it can be expanded sufficiently to make a secure joint between the hose and sleeve and without permitting the expanding-tool to injure the hose, and this desirable thickness is attained by the teeth, as $d$, for example. Again, it is desirable to have the ferrule thin in order to reduce the power required to expand it, and this desirable end is attained by notching or grooving the ferrule, so as to reduce the expansible cross-sectional area thereof. The part of the ferrule to be expanded in the ferrule shown in Figs. 5, 6, and 7, for example, is only of a thickness equal to that of the ferrule between the base of a notch or tooth and the exterior periphery of the ferrule, which renders it comparatively easily expanded, while the thickness of the ferrule, so far as its contact with the expander is concerned, is increased by an amount equal to the depth of its teeth or internal projections.

I am aware that split rings have been provided with corrugations or teeth and clamped upon or expanded within hose-sections in making joints; but a split ring would be practically useless for my purpose, as it would not when expanded have sufficient strength to clamp the hose in position. My ferrules when expanded remain fixedly set and cannot contract. A further advantage of my ferrules is that they offer less obstruction to the passage of water, as the spaces between the teeth, which are enlarged when the ferrules are expanded, permit water to pass which would be obstructed if the ring were solid.

In Fig. 8 is shown a machine for expanding the ferrules, which machine forms the subject of another application for patent filed herewith. This machine, in brief, comprises a tube E, fixed to a standard F on a suitable base. Through this tube extends a reciprocatory rod G, which is connected at its inner end by links $h$ to a lever H, pivoted to an adjacent upright F. On the outer end of rod G is a removable conical expander-head $g$, which is solid and may be detachably attached to rod G by screw-threads or otherwise. This expander-head is about equal at its greatest diameter to the internal diameter of the hose. In using it rod G is moved outward, the expander-head removed, a ferrule D is slipped on rod G, and the expander-head replaced with its point toward the ferrule. Then a coupling-sleeve is slipped onto the end of a hose and the latter, with the sleeve, slipped over the expander, ring, and tube E, as shown in Fig. 8. Then the expander-head is drawn out through the ferrule, which is held in position by the end of tube E, and the ferrule is expanded, the conical expander working with powerful leverage against the inner circumference of the ring and expanding it outward, crowding the hose tightly against the thimble. The length of the tube is such that the ferrule is kept in the sleeve in front of the rib $a^2$, (or $b^2$,) making a strong joint. The expander-head pulls out of the ferrule into the sleeve, and the coupling can then be readily removed from the tube, and the operation can be repeated on other couplings.

In Fig. 5 I show the preferred form of ferrule with internal corrugations or teeth.

Fig. 6 shows a ferrule with internal notches, and Fig. 7 a ferrule with external notches. In each case the expansible portion of the ring is solid and continuous, but of less thickness than the ring as a whole. The internal corrugations or teeth are preferable to the external corrugations or teeth, as a continuous unbroken joint will then be formed between the exterior surface of the hose and internal surface of the thimble. The ferrules remain set as expanded, being solid. Hence the joint is close and certain. As I can use a solid expanding-head, I can make the expansible part of the ferrule heavier than is possible for use with an expansible expanding-head and expand it with less power.

The ferrules are to be properly proportioned to the hose and couplings, so as to bind the hose securely therein and would hold securely without the ribs $a^2$ on the sleeves. However, I prefer to use these ribs, as they insure a positive fastening.

Having thus described my invention, what I therefore claim as new, and desire to secure by Letters Patent thereon, is—

1. An expansible ferrule consisting of a solid ring having its expansible cross-section area reduced by notches or grooves, substantially as and for the purpose described.

2. An expansible ferrule consisting of a solid ring having one annular portion of uniform thickness, and a concentric annular portion divided into sections, substantially as and for the purpose described.

3. An expansible ferrule consisting of a solid ring having a continuous cylindrical portion of uniform thickness, and an annular series of projections or teeth around such portion substantially as described.

4. In combination a coupling member having a sleeve, and a hose inserted in said sleeve, with a ferrule expanded in the hose end within the sleeve, said ferrule comprising a continuous ring provided with notches or grooves to reduce its expansible cross-section area substantially as and for the purpose described.

5. In combination a coupling member having a sleeve, and a hose having its end inserted in said sleeve, with a ferrule inserted and expanded in the hose end within the sleeve, said ferrule comprising a continuous ring provided with corrugations or teeth, substantially as and for the purpose described.

6. The combination with a coupling member having a sleeve provided with an inwardly-projecting rib near one end, and a hose having its end fitted into said sleeve; with an expansible ferrule inserted and expanded in the hose within the sleeve said ferrule consisting of a metallic ring having an unbroken peripheral portion and an internal annular series of corrugations or teeth, substantially as and for the purpose described.

In testimony that I claim the foregoing as my own I affix my signature in presence of two witnesses.

HOWARD B. SHERMAN.

Witnesses:
CHAS. R. SYLVESTER,
F. M. ANDRESS.